United States Patent [19]

Cameron

[11] Patent Number: 4,573,712
[45] Date of Patent: Mar. 4, 1986

[54] REDUCER COUPLING AND POSITIONER TOOL FOR THE COUPLING

[75] Inventor: Donald C. Cameron, Tulsa, Okla.

[73] Assignee: The Dow Chemical Company, Midland, Mich.

[21] Appl. No.: 456,632

[22] Filed: Jan. 7, 1983

[51] Int. Cl.[4] ............................................. F16L 55/00
[52] U.S. Cl. ......................................... 285/12; 285/39; 285/177; 403/343; 403/299; 166/77.5
[58] Field of Search ............... 285/39, 12, 177, 330, 285/354, 332.2, 392, 169, 176; 403/343, 299; 166/97, 77, 77.5

[56] References Cited

U.S. PATENT DOCUMENTS

| | | | |
|---|---|---|---|
| 123,914 | 2/1872 | Kenyon et al. | 285/39 |
| 1,031,587 | 7/1912 | Reisik | 285/330 |
| 1,326,626 | 12/1919 | Wolfe | 285/39 |
| 1,346,403 | 7/1920 | Grierson | 285/177 |
| 2,419,453 | 4/1947 | Kocevar | 285/39 |
| 2,733,940 | 2/1956 | Millar | 285/39 |
| 3,393,930 | 7/1968 | Ziherl et al. | 285/354 |
| 4,316,316 | 2/1982 | Kappenhagen | 285/354 |

Primary Examiner—Cornelius J. Husar
Assistant Examiner—Todd G. Williams
Attorney, Agent, or Firm—V. Dean Clausen

[57] ABSTRACT

The invention disclosed herein includes a reducer coupling, a positioner tool for connecting the coupling to a conduit section, and a nut for securing the positioner tool to the coupling. The reducer coupling is useful in various operations, such as some oil field operations in which it is used to connect a smaller conduit (delivery line) into a larger conduit (production casing). In practice, the positioner tool is secured to the reducer coupling and the coupling is moved into its hook-up position above the production casing, by attaching a rig to the positioner tool. The coupling can then be threaded into the casing by turning the positioner tool with a wrench, or similar tool.

2 Claims, 3 Drawing Figures

REDUCER COUPLING AND POSITIONER TOOL FOR THE COUPLING

BACKGROUND OF THE INVENTION

The invention relates to a reducer coupling useful for connecting conduit sections of different sizes, and a positioner tool for moving the coupling into a desired position for making the connection. The positioner tool also provides a means for turning the reducer coupling to thread it into a conduit section.

There are many industrial operations in which a reducer coupling is used as a connection for joining two conduit sections of different sizes. The usual conduit connections are those where two sections of pipe are connected, or a pipe is connected to a valve connection, or a pipe is connected to a pump, or the like. For example, in oil field operations such as well stimulation and completion, it is common practice to use fittings known as swage nipples to connect the production casing with smaller piping. In these operations fluids are delivered from the smaller piping, usually under high pressure, through the nipple and into the production casing. To set up for such an operation, the usual procedure is to first lift the fitting into a "hook-up" position above the production casing. The large end of the nipple is then threaded into the production casing and turned down tight with a strap wrench, which fastens around the nipple just below the small end. Following this, the small end is connected into the delivery pipe with a conventional union fitting.

Swage nipples now in use have several drawbacks, which make them less than satisfactory for the operations described above and for other commercial applications. One problem is that swage nipples are structurally weak, particularly at the point where the wrench clamps around the fitting. The weakness is caused by severe deformation of the construction material during fabrication of the fitting. As the strap wrench is tightened on the nipple, it tends to slip and score the metal surface, causing further weakness at this point on the fitting. This weakness is particularly undesirable because of the high pressure conditions the fitting must endure during normal use.

The structural weakness of swage nipples, plus the fact that the small end of each fitting defines a "neck" portion, creates another problem. Sometimes, particularly after an operation is completed, the fittings are dropped or otherwise mis-handled. Frequently, such treatment causes the neck of the fitting to break off, so that it must be repaired or replaced for the next operation. This is both costly and inconvenient. The reducer coupling of this invention avoids the problems described above and it is much cheaper to make than the swage nipples now available. For example, the present reducer coupling is a one-piece structure which can be easily lifted into the "hook-up" position described above, and coupled to the production casing using a tool designed for that purpose. In addition, the present coupling is a much more durable structure than the prior swage nipples, and the smaller end of the fitting has a hub connection which is protected from breaking off, or sustaining other damage during handling of the fitting.

SUMMARY OF THE INVENTION

The reducer coupling of this invention is designed for connecting conduit sections of different sizes. The invention includes a positioner tool for moving the reducer coupling into a desired "hook-up" position. This tool is also designed to engage another tool, such as a wrench, for connecting the reducer coupling to a conduit section. Means for securing the positioner tool to the coupling is also a component of this invention. Basically, the reducer coupling comprises a one-piece coupler body, having a cavity defined in each end of the body. Between the cavities is a bridge portion, which includes a hub integral with the bridge. The hub is upstanding from the bridge, it extends into one of the cavities, and a fastener means is defined on the outside of the hub. The coupler body includes a central opening therein, which extends lengthwise through the bridge and the hub.

An upstanding rim defines the periphery of each cavity and there is a fastener means on the outside of the coupler body adjacent to one of the cavities. The positioner tool is generally defined by an elongate pin having a shoulder thereon which divides the pin into a hanger section and a spindle section. The hanger section is adapted for hooking into a means for moving the reducer coupling into a desired position. The securing means engages the fastener means on the hub and seats against the shoulder on the positioner tool, to fasten the positioner tool to the reducer coupling.

DESCRIPTION OF THE INVENTION

Figure 1:
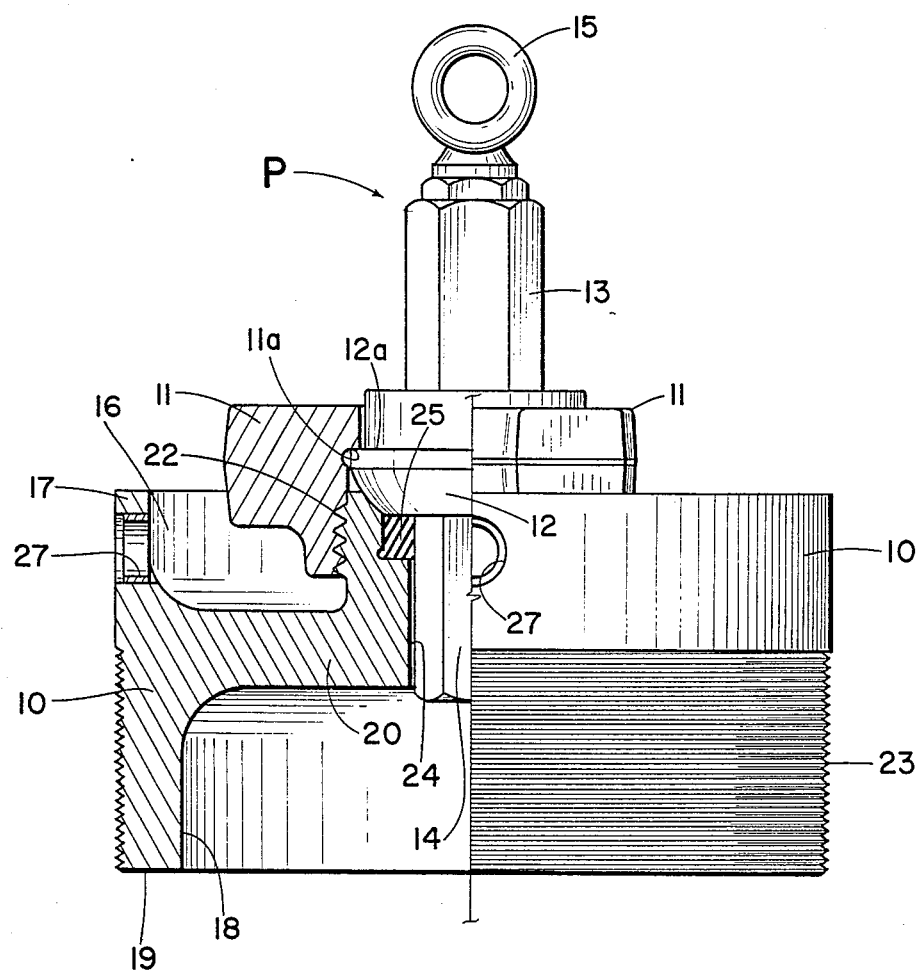
FIG. 1 is an assembly view, partly in section, of the several components of this invention, which include a reducer coupling, positioner tool for the coupling, and nut for securing the positioner tool to the coupling.
Figure 2:
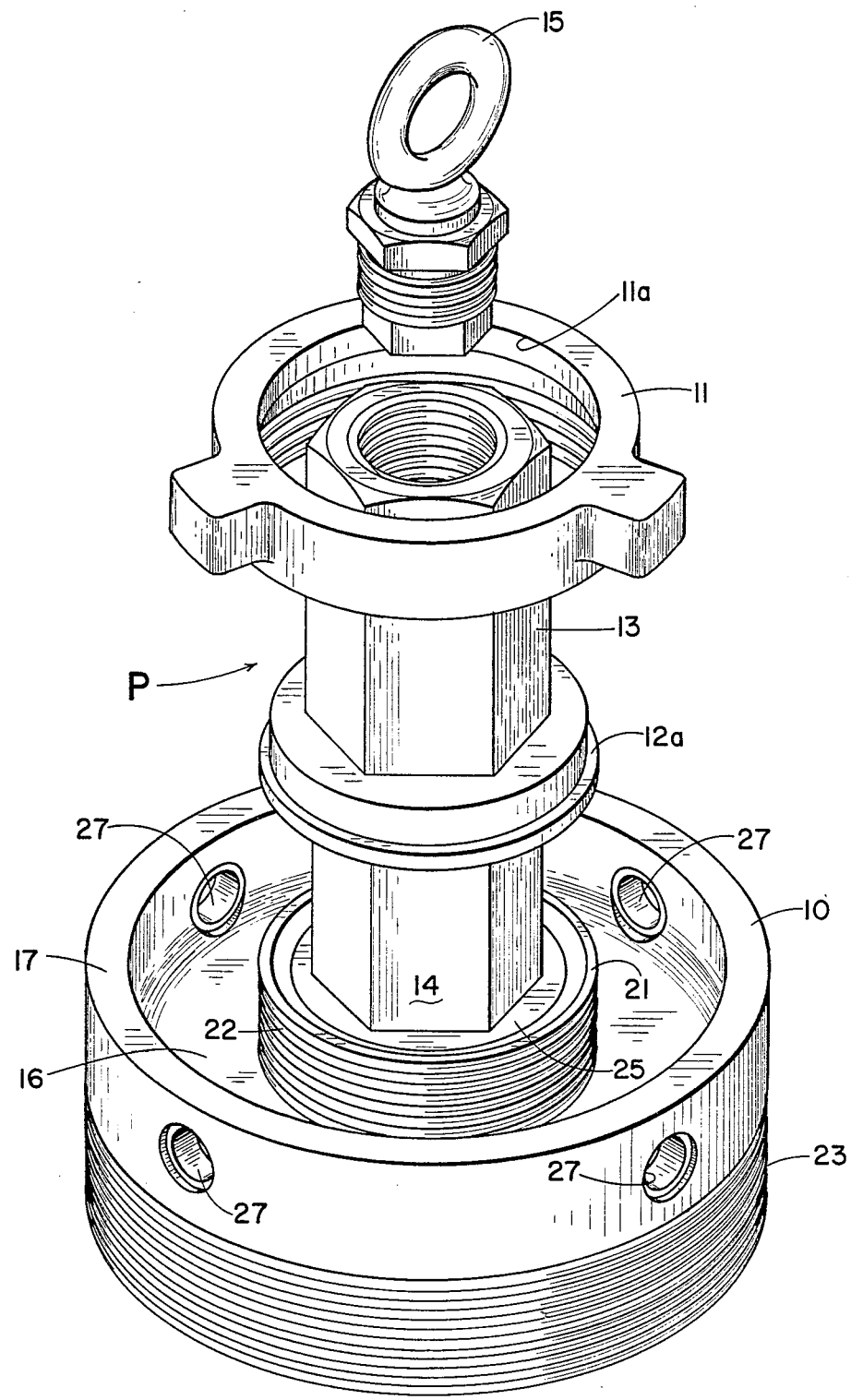
FIG. 2 is a view, in exploded illustration, of the various components of the invention shown in FIG. 1.

In the drawing, referring particularly to FIGS. 1 and 2, the basic components of the invention consist of a reducer coupling 10; a positioner tool, generally indicated by the letter P; and a wing nut 11. The positioner tool P is generally made up of an elongate pin having a shoulder segment 12 thereon. The shoulder segment generally divides the pin into a hanger section 13, above the shoulder segment, and a spindle section 14, which extends below the shoulder segment. The hanger section 13 includes an eyebolt fastener 15, which threads into the hanger section (note FIG. 2).

Referring particularly to FIG. 1, the reducer coupling 10 consists of a one-piece body structure. At the top of the structure is a first cavity 16, which is defined by a concave surface. An upstanding rim 17 defines the periphery of cavity 16. At the bottom of the body structure is a second cavity 18, also defined by a concave surface. The periphery of cavity 18 is also defined by an upstanding rim 19. The solid part of the body structure between cavities 16 and 18 is a bridge portion 20. The body structure of this coupling also includes a hub 21, which is integral with the bridge portion 20, and which extends into the cavity 16. A male screw thread 22 is cut into the outside surface of the hub wall.

The reducer coupling also includes a male screw thread 23, which is cut into the outside surface of the body of the coupling adjacent to the cavity 18. There is a central opening 24 in the body structure, which extends lengthwise through the hub 21 and the bridge portion 20. A gasket 25 is fitted into (seated in) the opening 24 near the top of the hub, to provide a seal against fluid leakage. Wing nut 11 provides a means for securing the positioner tool P to the reducer coupling 10, as illustrated in FIG. 1. Looking specifically at FIG. 1, it can be seen that the spindle section 14 fits down into opening 24, so that the bottom of the shoulder segment 12 seats against gasket 25. Once the positioner tool is set down into the opening 24, wing nut 11 is threaded on hub 21 and tightened down until lip 11a on the nut seats against the top face 12a of shoulder segment 12.

Figure 3:
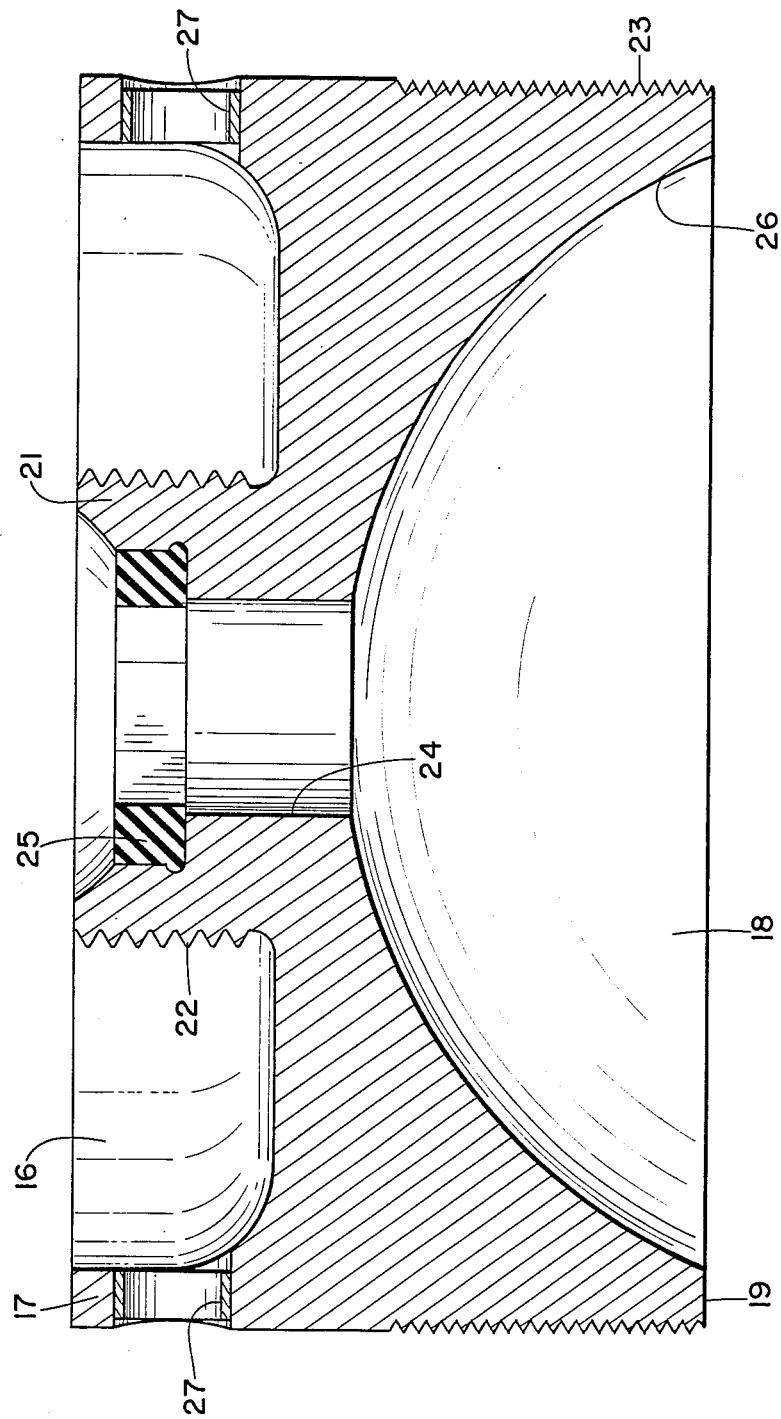
FIG. 3 is a front elevation view, in section, of a second embodiment of the reducer coupling of this invention.

A second embodiment of the reducer coupling of this invention is illustrated in FIG. 3. This reducer coupling differs from the embodiment illustrated in FIG. 1 only by the configuration of the bottom cavity in the body structure of the coupling. For this reason the same reference numerals are used to identify the similar parts of both embodiments of the coupling. As mentioned earlier, the bottom cavity 18 of the reducer coupling illustrated in FIG. 1 has a concave surface. As shown in FIG. 3, however, the surface of the bottom cavity 18 of this reducer coupling is a hemispherical surface, as indicated by numeral 26. In the actual practice of this invention, it is contemplated that machining the coupling with a hemispherical surface will add significantly to the capability of the coupling to withstand high pressure.

OPERATION

The invention can be illustrated by describing the use of the reducer coupling 10, the positioner tool P, and wing nut 11, in a typical oil field operation, as described earlier. Referring to FIGS. 1 and 2, the positioner tool P is first seated into the reducer coupling 10 and secured to the coupling by the wing nut 11, in the manner described earlier. A line from a lifting rig is hooked into the eyebolt 15 and the coupling is lifted into its hook-up position above the open end of the production casing. The lift rig and production casing are not illustrated in the drawing.

The next step is to thread the reducer coupling into the production casing by means of threads 23. The eyebolt 15 is mounted on a swivel, so that it is easier for the operator to line up the threads 23 with the corresponding threads on the production casing. As the reducer coupling is "started" onto the production casing it is sometimes partly tightened down with a wrench, in the form of a short, round bar (not shown). The bar wrench is inserted, sequentially, into the several openings 27 in the upper rim 17 of the coupling, to rotate the coupling a few turns until it is snugged into position on the production casing. The coupling is then further tightened down on the casing by applying a wrench to the hanger section 13 of the positioner tool P. The wrench (not shown) has a grip specifically designed to fit the hexagonal shape of the hanger section 13 and more force can be applied to the wrench, if needed, by hammering on the handle.

The next step is to unscrew the wing nut 11 from hub 21, so that the positioner tool P can be pulled out of the reducer coupling 10. After removing the positioner tool, the hub 21 of the reducer coupling is connected into the fluid delivery pipe (not shown). This connection is made using a standard female sub unit fitting, which includes the wing nut 11. The reducer coupling is then in its normal operating position.

Referring to the positioner tool P, as illustrated and described herein, the hanger section 13 of this tool has a hexagonal shape (cross-section). In actual practice, however, the hanger section of the positioner tool may be made in any one of several shapes, such as round, elliptical, square, rectangular, triangular, or other known shapes. The spindle section 14 of the positioner tool, as shown in the drawing, also has a hexaponal shape; but this part of the tool can also be made in various other shapes.

As mentioned earlier, the hub 21 of the present reducer coupling 10 is protected from breaking off, or sustaining other damage, so that it has a distinct advantage over the prior swage nipples. One reason the hub 21 is not vulnerable to breakage or other damage, is because it is "recessed" into the top cavity 16 of the coupling, that is, it does not extend above the top edge of the upper rim 17. Also, when the wing nut 11 is in place on the hub 21 it protects the hub threads 22 from possible damage during handling of the fitting.

The invention claimed is:

1. In combination, a reducer coupling for connecting a conduit section of one size to a conduit section of a different size, a positioner tool, and means for securing the positioner tool to the reducer coupling, the combination comprises:

the reducer coupling is generally defined by a one-piece coupler body;

a first cavity is defined in one end of the coupler body, and a second cavity is defined in the opposite end of the coupler body;

a bridge portion is defined within the coupler body between the first and second cavities;

the coupler body includes an upstanding hub, the hub is integral with the bridge portion, the hub extends into the first cavity, and the hub includes fastener means on the outside of the hub;

the coupler body includes a central opening therein; the opening extends lengthwise through the bridge portion and the hub;

the coupler body includes a first upstanding rim, which defines the periphery of the first cavity, and a second upstanding rim, which defines the periphery of the second cavity;

the coupler body includes fastener means on the outside of the coupler body adjacent to the second cavity; and the positioner tool is generally defined by an elongate pin having a shoulder thereon;

the shoulder generally divides the pin into a hanger section, and a spindle section;

the central opening of the coupler body is adapted to receive the spindle section;

the securing means engages the fastener means on the hub and seats against the shoulder on the positioner tool, to thereby secure the positioner tool to the reducer coupling.

the hanger section of the positioner tool is adapted for hooking into a means for moving the reducer coupling into a desired position; and the hanger section of the positioner tool is adapted for engagement with a tool capable of rotating the reducer coupling.

2. The combination of claim 1 in which the fastener means on the hub is a male screw thread, and the securing means is a nut having a female thread which engages the hub thread.

* * * * *